Patented May 26, 1953

2,640,042

UNITED STATES PATENT OFFICE 2,640,042

BUTADIENE-VINYLPYRIDENE COPOLYMER AND CARBON BLACK COMPOSITION

Louis H. Howland, Watertown, and Victor S. Chambers, Naugatuck, Conn., assignors to United States Rubber Company, New York, N. Y., a corporation of New Jersey No Drawing. Application November 6, 1951, Serial No. 255,137

8 Claims. (Cl. 260—41.5)

This invention relates to molded and vulcanized synthetic rubber products having satisfactory flexibility and resilience at very low (subzero) temperatures, and also having satisfactory physical properties at ordinary (room and elevated) temperatures.

It is known that molded and vulcanized products made from synthetic rubber aqueous emulsion polymerizates of butadiene-1,3 (commonly called butadiene) have excellent flexibility and resilience at very low temperatures down to —70° F., but have very poor physical properties at ordinary (room and elevated) temperatures. Synthetic rubber emulsion polymerizates of mixtures of 85 to 95 parts (all parts and percentages herein are by weight) of butadiene with correspondingly 15 to 5 parts of a vinyl pyridine, so-called Arctic rubbers, and especially the emulsion polymerizate of 90 parts of butadiene and 10 parts of 2-vinyl pyridine, have been recommended for the manufacture of articles, such as tires, which are to be used at very low temperatures in the range down to —70° F. The physical properties at ordinary temperatures of tires, for example, made from such copolymers, are much superior to tires similarly made from emulsion polymerized polybutadiene without too much loss in low temperature resilience and flexibility. There are two disadvantages, however, in the use of 5-15 parts of a vinyl pyridine for copolymerizing with the 95-85 parts of butadiene. Firstly, the synthetic rubber product activates the usual accelerators so much that it is difficult to get a proper cure. Secondly, the stocks do not adhere well to similar stocks made from natural rubber, or other synthetic rubbers, or even to similar butadiene-vinyl pyridine stocks.

We have found that the above two disadvantages of synthetic rubber emulsion polymerizates of 85-95 parts of butadiene and 15-5 parts of a vinyl pyridine are reduced or eliminated, and surprisingly with very little, if any, appreciable sacrifice of physical properties at ordinary temperature, by using an emulsion polymerizate of over 97, e. g. 97.5, to 99.5 parts of butadiene hydrocarbon and correspondingly less than 3 to 0.5 parts of a vinyl pyridine. The low temperature resilience and flexibility of molded and vulcanized articles from the new copolymers of extremely low vinyl pyridine content as to be expected are superior to those made from the known copolymers of higher vinyl pyridine content, but it could not be anticipated and it is wholly unexpected that such reduction in the vinyl pyridine content of the copolymers would not so decrease the physical properties of the copolymers at ordinary temperatures as to make them unsatisfactory, similarly to polybutadiene.

The butadiene hydrocarbon in the polymerizable aqueous emulsion may be butadiene-1,3, 2-methyl-butadiene-1,3 (isoprene), 2,3-dimethyl-butadiene, piperylene or mixtures thereof. The vinyl pyridine which is copolymerized with the butadiene hydrocarbon in the aqueous emulsion may be a monovinyl pyridine, a monoalkyl monovinyl pyridine, or a dialkyl monovinyl pyridine. Examples of vinyl pyridines which may be used are 2-vinyl pyridine, (or alpha vinyl pyridine), 3-vinyl pyridine (or beta vinyl pyridine), 4-vinyl pyridine (or gamma vinyl pyridine), 2-methyl-5-vinyl pyridine, 5-ethyl-2-vinyl pyridine, 2-4-dimethyl-6-vinyl pyridine, 2,4-diethyl-6-vinyl pyridine.

The mixture of over 97 to 99.5 parts of butadiene hydrocarbon with correspondingly less than 3 to 0.5 parts of a vinyl pyridine may be polymerized in aqueous emulsion at conventional polymerization temperatures (generally 0° F. to 150° F., using anti-freeze, such as methanol at the low temperatures), and in the presence of conventional emulsifying agents, initiators or catalyst, activators, modifiers or regulators, shortstopping agents and antioxidants, such as are used in conventional synthetic rubber emulsion-polymerizations.

The invention is illustrated in the following: A mixture of polymerizable monomers for preparing the products of the present invention was emulsion polymerized to about 60% conversion at 41° F. according to the following recipe, and coagulated, washed and dried in the conventional manner: butadiene-1,3 (97.5 parts), 2-vinyl pyridine (2.5 parts), fatty acid soap as emulsifier (5 parts), cumene hydroperoxide as catalyst (0.15 part), tetraethylene pentamine as activator (0.15 part), sodium salt of naphthalene sulfonic acid condensed with formladehyde as stabilizer (1 part), ethylenediamine tetraacetic acid as reaction controller (0.01 part), mixed tertiary dodecyl, tetradecyl and hexadecyl mercaptan as modifier (0.3 part), water (200 parts). A conventional tire tread compound (100 parts of synthetic rubber, 50 parts of carbon black, 5 parts of softener, 5 parts of zinc oxide, 1.7 parts of sulfur and 0.2 part of accelerator) was made from the above synthetic rubber, and test pieces were molded therefrom and vulcanized at 292° F. While carbon black need not be used in all compounds of the present invention, generally the molded and vulcanized compounds will contain from 25 to 75 parts of carbon black per 100 parts of the synthetic rubber. Test pieces of compositions similar to the above 100 parts synthetic rubber and 50 parts of carbon black were also made from polybutadiene emulsion polymerized rubber, from a synthetic rubber emulsion polymerizate of a mixture of 90 parts of butadiene and 10 parts of 2-vinyl pyridine, and from a synthetic rubber emulsion polymerizate of a mixture of 97 parts of butadiene and 3 parts of styrene, molded and cured at 292° F. Room temperature tensile strength and elongation tests were run on the test pieces with results shown in the following table:

|  | Ave. Tensile Strength (lbs./sq. in.) | Ave. Elongation (percent) |
| --- | --- | --- |
| 97.5 Butadiene/2.5 vinyl pyridine | 3,250 | 510 |
| 90 Butadiene/10 vinyl pyridine | 3,570 | 530 |
| 97 Butadiene/3 styrene | 2,670 | 490 |
| 100 Butadiene | 2,500 | 540 |

The above table shows that with proper cures (elongations being comparable), the 97.5 butadiene/2.5 vinyl pyridine copolymer synthetic rubber of the present invention has a tensile strength of 3250 lbs./sq. in. which is surprisingly in the range of the known high tensile strength of 3570 lbs./sq. in. of the 90 butadiene/10 vinyl pyridine copolymer synthetic rubber. Such high tensile strength with such a small amount of copolymerizable vinyl pyridine could in no way be expected when the tensile strength of the known polybutadiene synthetic rubber compound is only 2500 lbs./sq. in., and the tensile strength of a 97 butadiene/3 styrene copolymer synthetic rubber of 2670 lbs./sq. in. is not substantially different from the exceedingly low tensile strength of the polybutadiene rubber.

U. S. Patent 2,561,215 suggests adhesive compositions prepared from synthetic rubber emulsion copolymerizates of 50 to 97 parts of butadiene hydrocarbon and 50 to 3 parts of a vinyl pyridine blended with a phenolaldehyde resol in the range of 10 to 90 parts of resin to 90 to 10 parts of the synthetic rubber. The present invention in no way relates to such rubber-resin blend adhesives.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A molded and vulcanized synthetic rubber composition being flexible and resilient at subzero temperatures, said composition comprising 25 to 75 parts of carbon black per 100 parts of synthetic rubber, the synthetic rubber component thereof being an aqueous emulsion polymerizate of a mixture of more than 97 parts to not more than 99.5 parts of butadiene hydrocarbon and less than 3 parts to at least 0.5 part of material selected from the group consisting of monovinyl pyridines, monalkyl monovinyl pyridines and dialkyl monovinyl pyridines, in which the substituents are on carbon atoms in the ring.

2. A molded and vulcanized synthetic rubber composition being flexible and resilient at subzero temperatures, said composition comprising 25 to 75 parts of carbon black per 100 parts of synthetic rubber, the synthetic rubber component thereof being an aqueous emulsion polymerizate of a mixture of more than 97 parts to not more than 99.5 parts of butadiene-1,3 and less than 3 parts to at least 0.5 part of material selected from the group consisting of monovinyl pyridines, monoalkyl monovinyl pyridines and dialkyl monovinyl pyridines, in which the substituents are on carbon atoms in the ring.

3. A molded and vulcanized synthetic rubber composition being flexible and resilient at subzero temperatures, said composition comprising 25 to 75 parts of carbon black per 100 parts of synthetic rubber, the synthetic rubber component thereof being an aqueous emulsion polymerizate of a mixture of more than 97 parts to not more than 99.5 parts of butadiene hydrocarbon and less than 3 parts to at least 0.5 part of 2-vinyl pyridine.

4. A molded and vulcanized synthetic rubber composition being flexible and resilient at subzero temperatures, said composition comprising 25 to 75 parts of carbon black per 100 parts of synthetic rubber, the synthetic rubber component thereof being an aqueous emulsion polymerizate of a mixture of more than 97 parts to not more than 99.5 parts of butadiene-1,3 and less than 3 parts to at least 0.5 part of 2-vinyl pyridine.

5. A molded and vulcanized synthetic rubber composition being flexible and resilient at subzero temperatures, said composition comprising about 50 parts of carbon black per 100 parts of synthetic rubber, the synthetic rubber component thereof being an aqueous emulsion polymerizate of a mixture of more than 97 parts to not more than 99.5 parts of butadiene hydrocarbon and less than 3 parts to at least 0.5 part of material selected from the group consisting of monovinyl pyridines, monoalkyl monovinyl pyridines and dialkyl monovinyl pyridines, in which the substituents are on carbon atoms in the ring.

6. A molded and vulcanized synthetic rubber composition being flexible and resilient at subzero temperatures, said composition comprising about 50 parts of carbon black per 100 parts of synthetic rubber, the synthetic rubber component thereof being an aqueous emulsion polymerizate of a mixture of more than 97 parts to not more than 99.5 parts of butadiene-1,3 and less than 3 parts to at least 0.5 part of material selected from the group consisting of monovinyl pyridines, monoalkyl monovinyl pyridines and dialkyl monovinyl pyridines, in which the substituents are on carbon atoms in the ring.

7. A molded and vulcanized synthetic rubber composition being flexible and resilient at subzero temperatures, said composition comprising about 50 parts of carbon black per 100 parts of synthetic rubber, the synthetic rubber component thereof being an aqueous emulsion polymerizate of a mixture of more than 97 parts to not more than 99.5 parts of butadiene hydrocarbon and less than 3 parts to at least 0.5 part of 2-vinyl pyridine.

8. A molded and vulcanized synthetic rubber composition being flexible and resilient at subzero temperatures, said composition comprising about 50 parts of carbon black per 100 parts of synthetic rubber, the synthetic rubber component thereof being an aqueous emulsion polymerizate of a mixture of more than 97 parts to not more than 99.5 parts of butadiene-1,3 and less than 3 parts to at least 0.5 part of 2-vinyl pyridine.

LOUIS H. HOWLAND.
VICTOR S. CHAMBERS.

References Cited in the file of this patent

UNITED STATES PATENTS

| Number | Name | Date |
|---|---|---|
| 2,402,020 | Cislak et al. | June 11, 1946 |
| 2,561,215 | Mighton | July 17, 1951 |

FOREIGN PATENTS

| Number | Country | Date |
|---|---|---|
| 595,290 | Great Britain | Dec. 1, 1947 |

OTHER REFERENCES

Chemical Engineering, vol. 57, No. 9, September 1950, page 107.